United States Patent [19]
Heck

[11] Patent Number: 6,103,184
[45] Date of Patent: Aug. 15, 2000

[54] HAND-HELD TORCH CIRCLE CUTTER

[76] Inventor: Philip Heck, 1480 Old U.S. 23 South, P.O. Box 425, Hartland, Mich. 48353

[21] Appl. No.: 09/394,515

[22] Filed: Sep. 13, 1999

[51] Int. Cl.$^7$ ..................................................... B23K 7/10
[52] U.S. Cl. ................................................. 266/70; 266/48
[58] Field of Search .................................. 266/48, 70, 58, 266/64

[56] References Cited

U.S. PATENT DOCUMENTS

| | | | |
|---|---|---|---|
| 4,021,025 | 5/1977 | Frame | 266/58 |
| 4,081,179 | 3/1978 | Frame | 266/70 |
| 4,256,288 | 3/1981 | Rojas | 266/70 |
| 4,778,155 | 10/1988 | Suchevich et al. | 266/70 |

FOREIGN PATENT DOCUMENTS

| | | | |
|---|---|---|---|
| 157599 | 7/1954 | Australia | 266/70 |

*Primary Examiner*—Scott Kastler
*Attorney, Agent, or Firm*—Charles W. Chandler

[57] ABSTRACT

A circle cutting attachment for supporting a hand-held torch for forming a circular opening in a metal workpiece.

4 Claims, 4 Drawing Sheets

HAND-HELD TORCH CIRCLE CUTTER

BACKGROUND OF THE INVENTION

This invention is related to an apparatus for supporting a torch for cutting a circular opening in a metal plate. More particularly, the apparatus employs a motor drivingly connected to a circular flat spur gear supported parallel to the workpiece surface being cut. Torch supporting structure is mounted on the gear so as to rotate therewith. The torch nozzle extends through an opening in the gear, directed toward the workpiece. The diameter of the hole being cut is determined by adjusting the distance between the torch nozzle and the axis of rotation of the gear.

Circle cutting attachments are known in the art for supporting a torch for cutting a circular hole in a workpiece. Generally such prior art devices comprise several components, and require a substantial mounting area.

Examples of prior art circle cutters include U.S. Pat. No. 4,021,025 issued May 3, 1977, and U.S. Pat. No. 4,081,179 issued Mar. 28, 1978 both to Ronald A. Frame for "Circle Cutter"; U.S. Pat. No. 4,256,288 issued Mar. 17, 1981 to Miguel E. Rojas for "Hole Cutting Apparatus"; and U.S. Pat. No. 4,778,155 issued Oct. 18, 1988 to Robert M. Suchevich and Lawrence A. Bollinger for "Plasma Arc Hole Cutter".

SUMMARY OF THE INVENTION

The broad purpose of the present invention is to provide an improved, component apparatus for supporting a hand-held torch for cutting a circle in a metal plate.

The preferred embodiment of the invention comprises a base that is mounted on the workpiece. The base supports a drive motor adjacent a circular opening in the base having a diameter larger than the opening to be cut by the torch. A planar drive gear is connected to the motor and disposed slightly above the workpiece and parallel to the workpiece. A second gear is mounted in a co-planar relationship with respect to the first gear and driven by the first gear. The second gear is rotatably mounted in the base opening. A rotating plate is mounted on the second gear, and has a rectangular slot aligned with a similarly-shaped slot in the second gear. The rotational axis of the second gear passes through the two aligned rectangular openings.

A torch-supporting block is locked in the slot in the rotating plate to support the torch nozzle an adjustable distance from the axis of rotation of the second gear. This distance defines the radius of the circle to be cut. The torch is carried on the block with the torch nozzle supported in the aligned slots so as to describe a circular path as the second gear is rotated.

The preferred embodiment of the invention provides a rapid means for forming accurate holes; is simple to operate; is useful for cutting aluminum, mild steel or stainless steel. There is no minimum plate thickness. The block is readily adjustable to accommodate the hole size settings. It eliminates free hand cutting and expensive magnetic drill cutters. The motor has a variable speed control to match the correct cutting speed with the plate thickness.

In use, the operator places a plasma torch in the mounting block, adjusts the mounting block with the desired hole diameter, starts the torch to pierce the metal and then turns on a speed controller on the motor to cut the hole.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
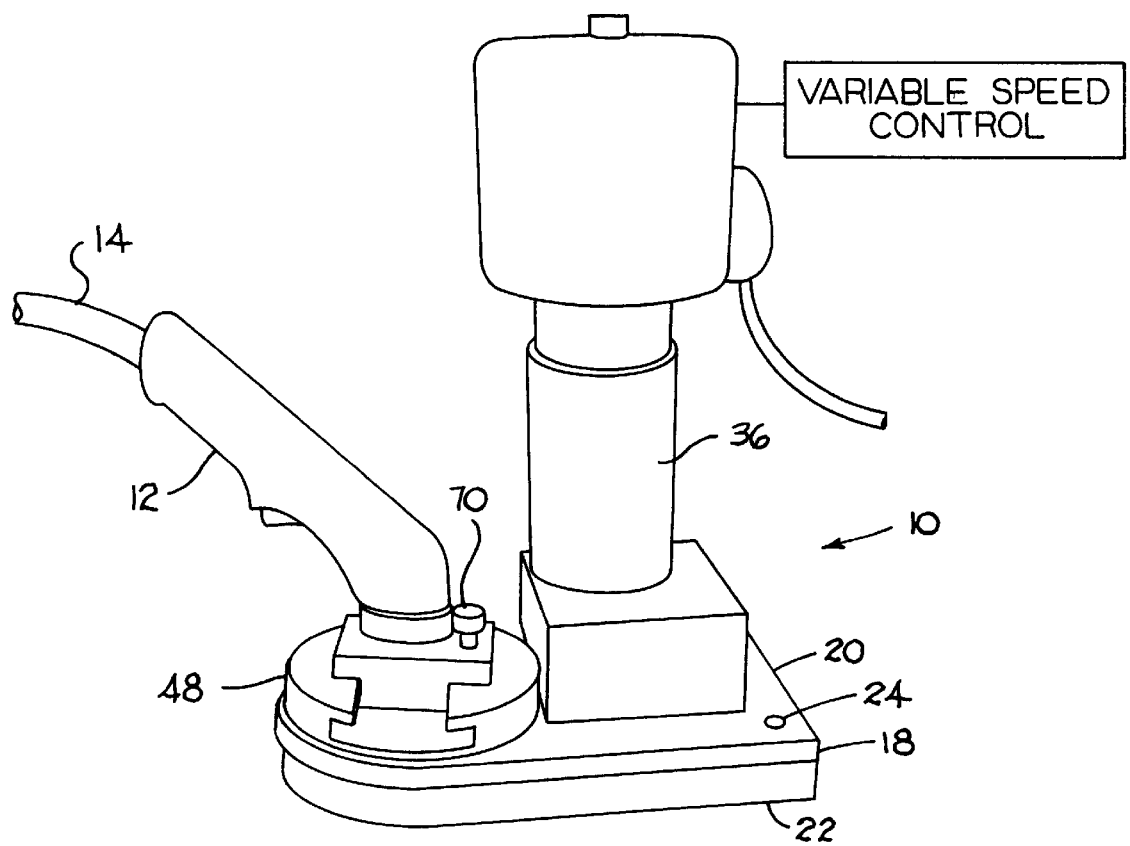
FIG. 1 is a perspective view illustrating the preferred embodiment of the invention.
Figure 2:
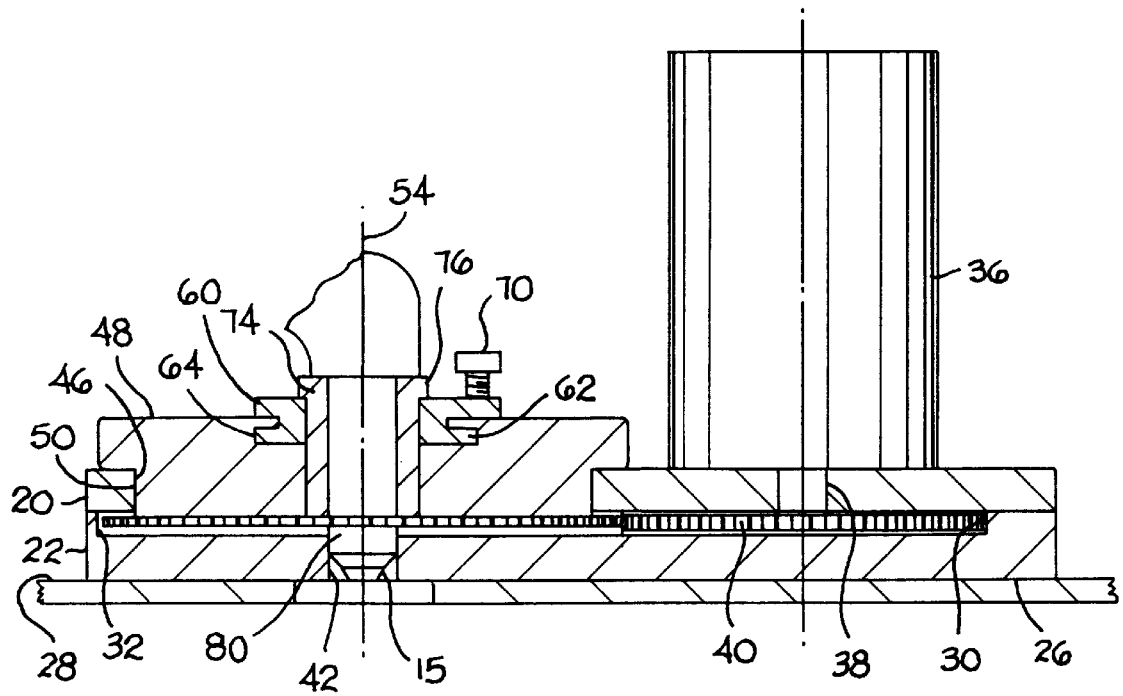
FIG. 2 is a vertical sectional view through the base to show the gear drive.
Figure 3:
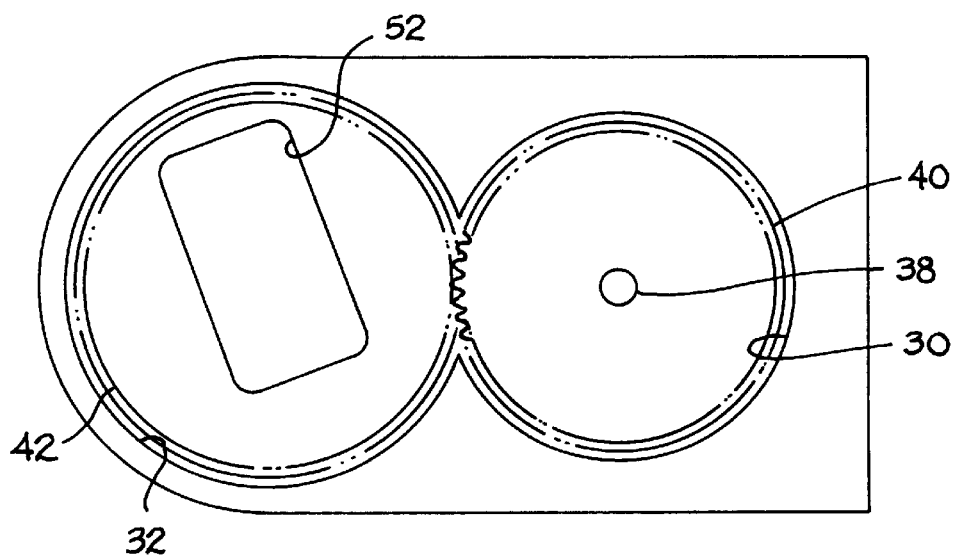
FIG. 3 is a horizontal sectional view of the gear drive.

Referring to the drawings, FIG. 1 illustrates a preferred circular cutting apparatus 10 which, for illustrative purposes, comprises a torch 12 having a hose 14 connected to a source of a combustible gas, not shown, and a nozzle 15, illustrated in FIGS. 1 and 2. The torch is conventional and may be what is known as a plasma hand-held torch.

The torch is mounted on a base 18, which comprises an upper aluminum base plate 20 and a lower brass base plate 22. The upper base plate is connected to the lower base plate in a face-to-face relationship by a plurality of threaded fastener means 24.

Referring to FIG. 2, the lower base plate has a flat bottom surface 26 adapted to be mounted on the flat surface of a plate-like workpiece 28. For illustrative purposes, the bottom base plate has a thickness of about ⅝". The bottom base plate has a pair of overlapping circular gear-receiving recesses 30 and 32.

A direct current gear motor is mounted on the upper base plate, and has a rotatable drive shaft 38 connected to a drive spur gear 40 slidably mounted in recess 30 to rotate the gear within the recess. The gear motor is preferably a conventional motor having a variable speed control 41 for determining the rotational rate of the drive shaft.

Gear 40 has a planar surface and is supported in recess 30 parallel to the bottom surface 26 of the lower base.

A second, driven gear 42 is disposed in recess 32 and meshed at 44 in such a way so as to be driven by the drive gear. The driven gear is also planar and supported parallel to the bottom surface of the lower base plate.

The lower base plate also has a nozzle receiving opening 42 extending between gear-receiving recess 32 and the bottom surface of the lower base plate.

The upper base plate has a circular opening 46, as best illustrated in FIG. 2, which is smaller than gear receiving recess 32.

A steel rotating plate 48 has an annular shoulder 50 seated on the upper base plate. Shoulder 50 has a diameter greater than that of opening 46 so as to be slidably mounted on the upper base plate around opening 46. The upper base plate is about ½" thick.

Figure 5:
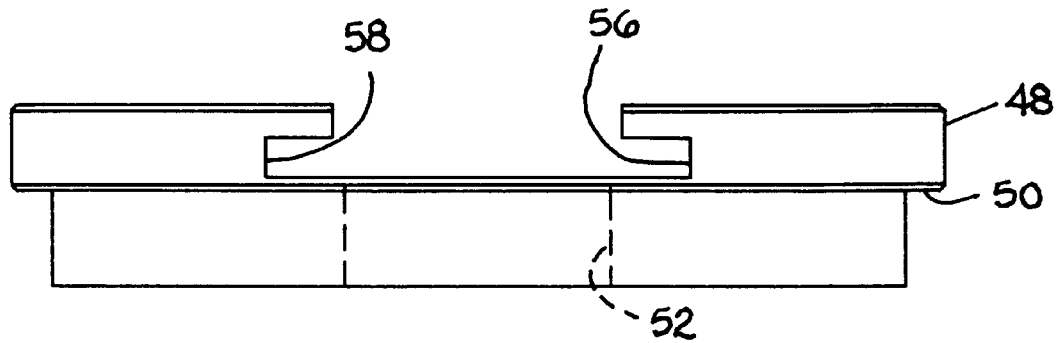
FIG. 5 is an end view of the rotating plate to show the torch supporting slot.
Figure 4:
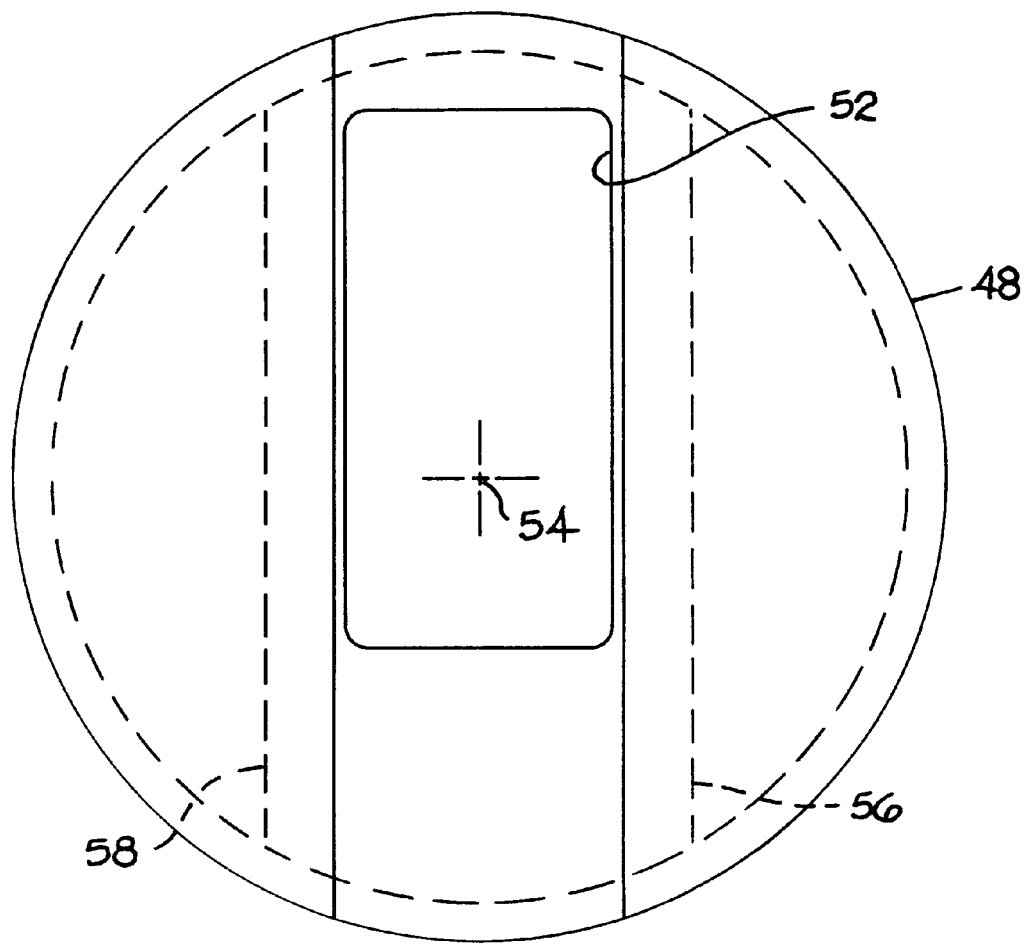
FIG. 4 is a view of the rotating plate.

Referring to FIGS. 4 and 5, the rotating plate has an elongated slot 52 which, for illustrative purposes, is about ½" wide and 3" long. Slot 52 encloses the axis of rotation 54 of the rotating plate as viewed in FIGS. 2 and 4. Slot 52 is adapted to receive the torch nozzle.

Referring to FIGS. 4 and 5, the rotating plate also has a pair of parallel-opposed grooves 56 and 58, which extend between opposite sides edges of the upper part of the rotating plate. Grooves 56 and 58 are on opposite sides of slot 52.

A torch-supporting block 60 has a pair of tongues 62 and 64 slidably mounted in grooves 56 and 58 so that the horizontal position of the block on the rotating plate can be adjusted with respect to the axis of rotation of the rotating plate. The block has a wing 66 with a fastener-receiving opening 68 for a threaded fastener 70 for locking the block in an adjusted position on the rotating plate.

Figure 7:
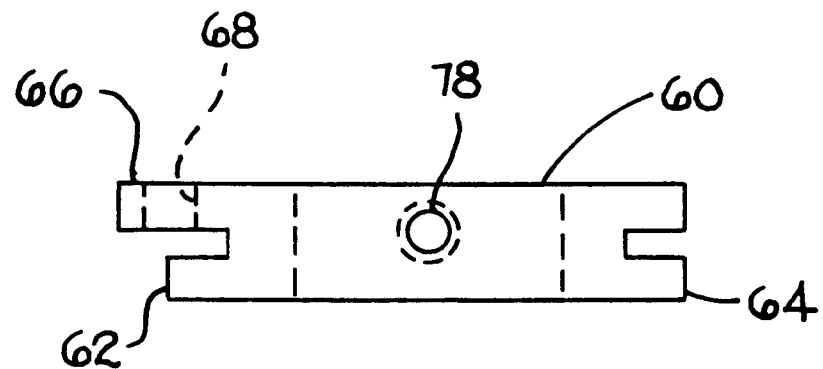
FIG. 7 is an end view of the torch mounting block.
Figure 6:
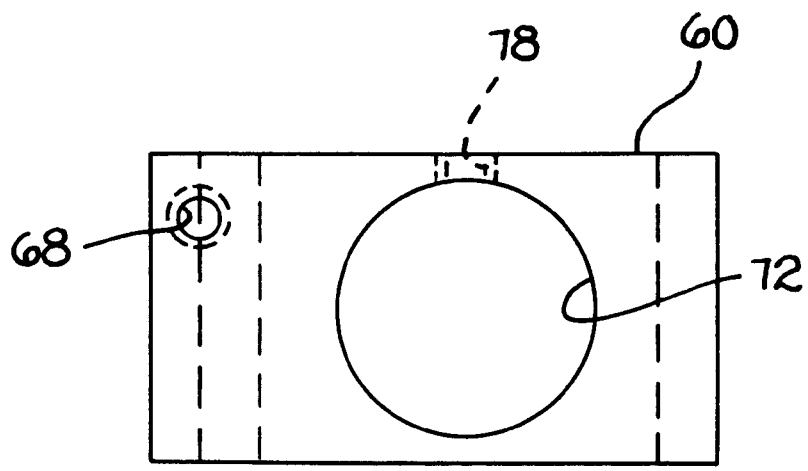
FIG. 6 is a plan view of the torch mounting block.

Referring to FIGS. 6 and 7, block 60 has an opening 72 for slidably receiving a steel bushing 74 having a collar 76. A threaded fastener 78, best shown in FIGS. 6 and 7, is mounted on block 60 for engaging collar 74 for locking it in position.

Bushing 74 is slidably mounted in opening 72 of block 60 so that the user can hold the handle of the torch as plate 48 is rotated to form a circle.

The bushing has a central opening 80 adapted to receive the nozzle 15 of a suitable plasma thermal torch or laser cutting system.

The driven gear, although illustrated as being driven by an electric motor, can also be rotated by a suitable hand crank. The position of the adjusting block is adjusted to define the distance between the tip of the torch nozzle and the axis of rotation of the rotating plate. The device will permit the use of most standard hand-operated torches, or plasma laser cutters to make holes and circles in the field on a construction site.

Figure 8:
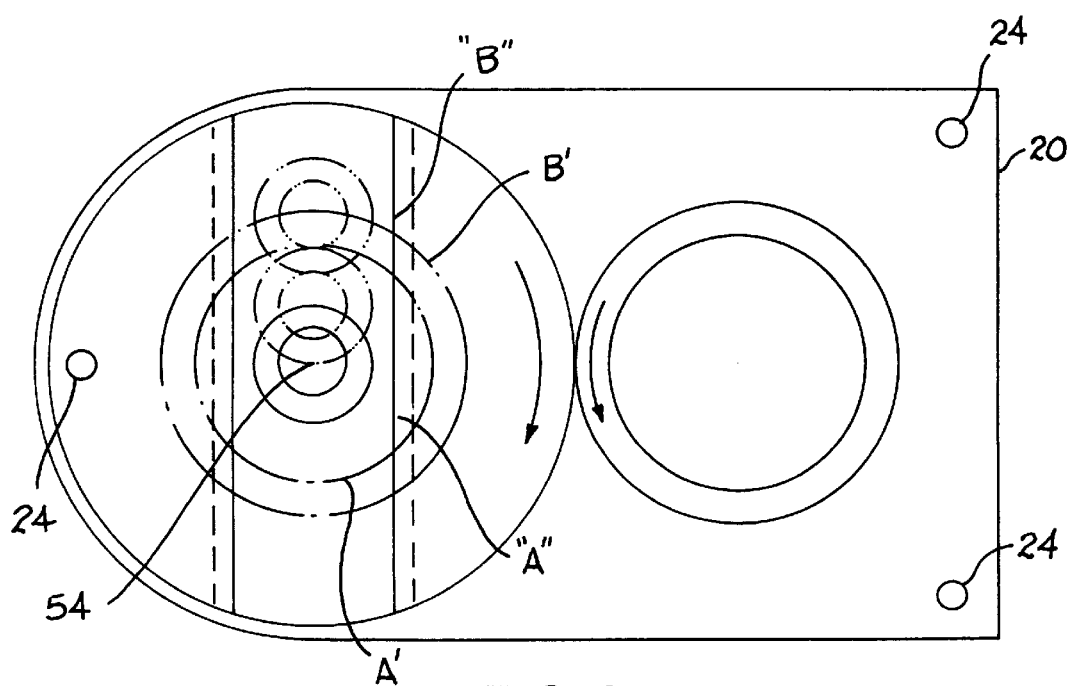
FIG. 8 is a schematic view illustrating the manner in which the torch nozzle is supported to cut holes of various sizes.

FIG. 8 illustrates how the torch-supporting block can be adjusted to form circles of various diameters. In position "A" of the block, the torch will form a circular opening A'. By increasing the distance between the torch tip and the center axis of rotation of the rotating plate to a position "B", the torch will cut a larger diameter circle, B'.

A simple magnetic or suction type device can be mounted on the device so that it can be used on overhead or vertical applications.

The rotating plate can also be rotated by means other than the preferred gear arrangement, such as a chain and gear drive for rotating the rotating plate.

Having described my invention, I claim:

1. An apparatus for cutting a circular opening in a metal plate, comprising:
    a base member having an upper surface, a planar bottom surface adapted to be mounted on a workpiece, and a circular opening extending between the upper surface and the bottom surface;
    a drive motor mounted on the base member adjacent said circular opening, the drive motor having a rotary drive shaft;
    a first gear member mounted on said drive shaft;
    a second gear member supported in the circular opening of the base member so as to be rotatable about an axis of rotation in a plane parallel to the plane of the bottom surface;
    the first gear member being drivingly connected to the second gear member to rotate the second gear member in said circular opening;
    the second gear member having a slot extending radially from said axis of rotation;
    a torch-supporting structure mounted on the second gear member adjacent said radial slot so as to be rotatable with the second gear member, and means for connecting the support structure an adjusted radial distance from said axis of rotation whereby a torch supported on said structure will direct a flame on the workpiece to cut a circle in the workpiece having a radius that depends upon the position of the support structure with respect to the axis of rotation of the second gear member;
    the torch supporting structure comprising:
        a rotating support plate mounted on the second gear member so as to be rotatable therewith, the support plate having a slot disposed to enclose the axis of rotation of the second gear member;
        an adjustable support block slidably mounted in the slot in the support plate so as to be adjustable along the slot to an adjusted distance from the axis of rotation of the second gear member, and means for locking the support block in an adjusted position with respect to the second gear member; and
        the support block having a nozzle-receiving opening aligned with the slot in the second gear member in a position in which a torch is operable to cut a circular hole in a workpiece beneath the second gear member.

2. An apparatus as defined in claim 1, in which the first gear has a planar configuration, and the second gear and the first gear are disposed in a generally co-planar relationship.

3. An apparatus as defined in claim 1, in which the slot in the rotating support plate has parallel opposed grooves, and the block has complementary tongues slidably receivable in the opposed grooves.

4. An apparatus as defined in claim 3, including a mounting collar disposed in the block, the mounting collar having an internal surface adapted to slidably receive a torch nozzle such that as the second gear is rotated, the torch nozzle is rotatable with respect to the second gear, and the torch body is disposed in a common attitude with respect to the base member whereby the user can hold the torch as the torch nozzle is moved in a circular path of motion to form said circular opening.

* * * * *